US012764047B2

(12) United States Patent
Rayman et al.

(10) Patent No.: US 12,764,047 B2
(45) Date of Patent: Oct. 13, 2026

(54) DUAL-BAND INSTRUMENT COMMUNICATION TO ACHIEVE HIGH BANDWIDTH AND LOW LATENCY

(71) Applicant: Keithley Instruments, LLC, Solon, OH (US)

(72) Inventors: Michael D. Rayman, Akron, OH (US); Dawson C. Green, Beaverton, OR (US); Yavuz Selim Saglam, Peoria, AZ (US)

(73) Assignee: Keithley Instruments, LLC, Solon, OH (US)

( * ) Notice: Subject to any disclaimer, the term of this patent is extended or adjusted under 35 U.S.C. 154(b) by 114 days.

(21) Appl. No.: 18/968,585

(22) Filed: Dec. 4, 2024

(65) Prior Publication Data

US 2025/0219921 A1 Jul. 3, 2025

Related U.S. Application Data

(60) Provisional application No. 63/616,420, filed on Dec. 29, 2023.

(51) Int. Cl.

*H04L 43/0852* (2022.01)
*H04L 43/02* (2022.01)
*H04L 43/50* (2022.01)

(52) U.S. Cl.

CPC .......... *H04L 43/0852* (2013.01); *H04L 43/02* (2013.01); *H04L 43/50* (2013.01)

(58) Field of Classification Search

None
See application file for complete search history.

(56) References Cited

U.S. PATENT DOCUMENTS

2012/0307666 A1* 12/2012 Giguere .................. H04L 43/50 370/252
2021/0025938 A1* 1/2021 Pöppe .............. G01R 31/31712
2023/0152374 A1* 5/2023 Sauer ................. G01R 13/0254 714/724
2024/0220380 A1* 7/2024 Richard .............. G06F 11/2221
2024/0369616 A1* 11/2024 Hilliges ............. G01R 31/2851
2024/0369617 A1* 11/2024 Hilliges ............. G01R 31/2834
2025/0219921 A1* 7/2025 Rayman .................. H04L 43/50
2025/0317375 A1* 10/2025 Lee ......................... H04L 47/12

* cited by examiner

*Primary Examiner* — Backhean Tiv
(74) *Attorney, Agent, or Firm* — Miller Nash LLP; Andrew J. Harrington; Krista Y. Chan

(57) ABSTRACT

Systems and methods implement communications between test and measurement instruments in a test and measurement system may include a first test and measurement instrument and a second test and measurement instrument. A dual-band communication link is coupled between the first test and measurement instrument and the second test and measurement instrument. The dual-band communication link includes a high-bandwidth communication link having a first latency to transfer test data between the first test and measurement instrument and the second test and measurement instrument. The dual-band communication link further includes a low-latency communication link that is independent of the high-bandwidth communication link. The low-latency communication link has a second latency that is less than the first latency to transfer control commands between the first test and measurement instrument and the second test and measurement instrument.

20 Claims, 5 Drawing Sheets

DUAL-BAND INSTRUMENT COMMUNICATION TO ACHIEVE HIGH BANDWIDTH AND LOW LATENCY

CROSS-REFERENCE TO RELATED APPLICATIONS

This disclosure claims priority under 35 U.S.C. § 119 to U.S. Provisional Patent Application No. 63/616,420, titled "DUAL-BAND INSTRUMENT COMMUNICATION TO ACHIEVE HIGH BANDWIDTH AND LOW LATENCY," filed on Dec. 29, 2023, the disclosure of which is incorporated herein by reference in its entirety.

TECHNICAL FIELD

The present disclosure relates generally to communication with test and measurement instruments, and more specifically to a dual-band communication link including separate low-latency and high-bandwidth communication links for transferring control commands and acquired test data to and from test and measurement instruments.

BACKGROUND

Test and measurement systems may include multiple test and measurement instruments for acquiring test data from a device under test (DUT). In such a test and measurement system, one of the test and measurement instruments typically functions as a master or primary test and measurement controller. The other test and measurement instruments are coupled to the primary test and measurement instrument through communication links to transfer test data acquired from the DUT to the primary test and measurement instrument. The primary test and measurement instrument includes a user interface that enables a user to analyze the acquired test data received from the other test and measurement instruments over the communication links. The user interface also enables the user to provide control commands over the communication links to control the operation of the other test and measurement instruments.

In such a test and measurement system, the test data acquired by the other test and measurement instruments corresponds to acquired waveforms of one or more signals of the DUT. These acquired waveforms may be very large files including gigabytes of test data. The large file sizes of the acquired waveforms necessitate the communication links between the other test and measurements instruments and the primary test and measurement instrument be high-bandwidth communication links. This high bandwidth is needed to transfer the acquired waveforms to the primary test and measurement instrument in a timely manner.

In addition to providing high bandwidth for the transfer of test data, the communication links must also provide low-latency communication. Low latency is required to enable the primary test and measurement instrument to provide control commands that control the operation of the other test and measurement instruments. For example, low latency is required where the system includes multiple other test and measurements instruments that are being operated in a coordinated manner to collectively acquire test signals of a DUT. Such a situation may arise in a production context where DUTs are being tested as part of a production process. In this situation, the reconfiguration or coordinated control of the multiple other test and measurement instruments by the primary test and measurement instrument ideally happens as quickly as possible to maximize the throughput of the test and measurement system and output of the production process. Latency and bandwidth are separate parameters of a communication link, and a high-bandwidth communication link may not have a low latency. The same is true for a low-latency communication link, which may not have a high bandwidth. For example, a high-bandwidth communication link like a peripheral component interconnect express (PCIe) bus utilizes a protocol that includes relatively large headers for packets of data being communicated. These large packet headers result in a relatively high latency for a PCIe bus. Accordingly, there is a need for improved communication links providing high bandwidth and low latency for use in test and measurement systems.

BRIEF DESCRIPTION OF ACCOMPANYING DRAWINGS

DETAILED DESCRIPTION

Figure 1:
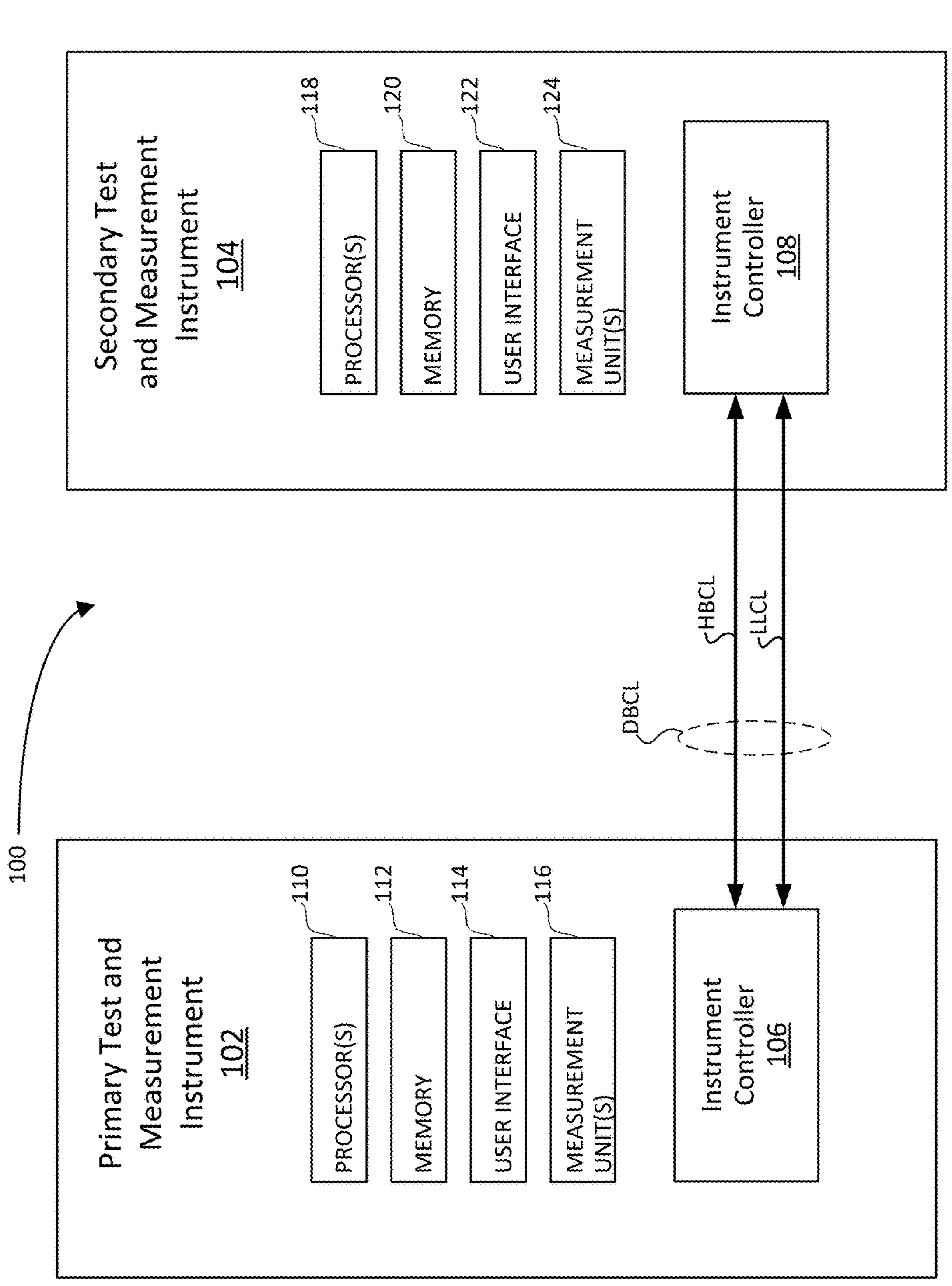
FIG. 1 is a block diagram of a test and measurement system including a primary test and measurement instrument coupled to a secondary test and measurement instrument through a dual-band communication link providing high bandwidth transfer of test data and low-latency communication of control commands in accordance with embodiments of the disclosure.

Embodiments of the disclosure are directed to a test and measurement system including a dual-band communication link for communicating large amounts of acquired test data through a high-bandwidth communication link and for communicating control commands through a low-latency communication link to control test and measurement instruments being utilized in the system. According to some embodiments of the disclosure, a test and measurement system includes a primary or first test and measurement instrument and a secondary or second test and measurement instrument. A dual-band communication link is coupled between the first test and measurement instrument and the second test and measurement instrument. The dual-band communication link includes a high-bandwidth communication link having a first latency to transfer test data between the first and second test and measurement instruments. The dual-band communication link further includes a low-latency communication link that is independent of the high-bandwidth communication link. The low-latency communication link has a second latency that is less than the first latency to transfer control commands between the first and second test and measurement instruments.

The dual-band communication link provides the high bandwidth required to perform timely transfer of the large amounts of test data acquired by the second test and measurement instrument to the first test and measurement instrument. In addition, through the independent low-latency communication link, the dual-band communication link enables timely reconfiguration of the second test and measurement instrument by the first test and measurement instrument. The test and measurement system may also include additional test and measurement instruments, and the low-latency communication link enables timely reconfiguration and coordinated control by the first or primary test and measurement instrument of these other test and measurement instruments. This control ideally happens as quickly as possible to maximize the throughput of the test and measurement system in testing devices under test (DUTs).

In test and measurement systems according to embodiments of the disclosure, instead of a manufacturer of the test and measurement instruments designing a new and custom high-bandwidth communication link, a third-party or off-the-shelf intellectual property (IP) core may be used. A core is a reusable block of logic or an integrated circuit layout design that has been designed by another party, and which may be licensed for use in components or systems being designed. The IP of a core defines the functionality of the core, with IP cores typically implemented through a field programmable gate array (FPGA) or an application specific integrated circuit (ASIC). For example, in embodiments of the disclosure the high-bandwidth communication link may be implemented through a third-party IP core including a peripheral component interconnect express (PCIe) bus core and a direct memory access (DMA) core.

This use of a third-party IP core reduces time and expense for a manufacturer of test and measurement instruments to design the required high-bandwidth communication link and overall test and measurement system. In embodiments of the disclosure, the low-latency communication link may be a custom or proprietary communication link implementing a low-overhead communication protocol to reduce the latency of the link. The low-latency communication link may, in other embodiments, be a standard low-overhead protocol communication link such as a serial communication link including a universal asynchronous receiver-transmitter (UART) or a serial communication link including a serial peripheral interface (SPI).

FIG. 1 is a block diagram of a test and measurement system 100 including a primary test and measurement instrument 102 coupled to a secondary test and measurement instrument 104 through a dual-band communication link DBCL in accordance with embodiments of the disclosure. The dual-band communication link DBCL provides high bandwidth transfer of test data acquired by the secondary test and measurement instrument 104 while also enabling the primary test and measurement instrument 102 to provide control commands with a low latency (LL) to the secondary test and measurement instrument 104. The terms "low latency" and "low-latency" may be abbreviated as "LL" in the present description and accompanying figures. An instrument controller 106 in the test and measurement instrument 102 and an instrument controller 108 in the test and measurement instrument 104 implement communications over the dual-band communication link DBCL. The instrument controllers 106 and 108 are part of the dual-band communication link DBCL, and the structure and operation of these instrument controllers are described in more detail below with reference to FIGS. 2 and 3.

The dual-band communication link DBCL includes a high-bandwidth communication link HBCL to transfer test data acquired by the secondary test and measurement instrument 104 to the primary test and measurement instrument 102. A low-latency communication link LLCL in the dual-band communication link DBCL provides low-latency communication of control commands from the primary test and measurement instrument 102 to the secondary test and measurement instrument 104 to reconfigure or otherwise control operation of the secondary test and measurement instrument 104. In the present description, each of the primary test and measurement instrument 102 and secondary test and measurement instrument 104 may alternately be referred to as the first test and measurement instrument and second test and measurement instrument, respectively, or simply as instrument 102 or instrument 104.

The test and measurement instrument 102 includes one or more processors 110 that may be configured to execute instructions from a memory 112 and may perform any methods and/or associated steps corresponding to such instructions. A user interface 114 is coupled to the one or more processors 110 and may include, for example, a keyboard, mouse, touchscreen, output display, file storage, and/or any other controls employable by a user to interact with the instrument 102. In some embodiments, the user interface 114 may be connected to or controlled by a remote interface (not illustrated) so that a user may control operation of the instrument 102 in a remote location physically away from the instrument. A display portion of the user interface 114 may be a digital screen such as an LCD, LED, or any other monitor to display waveforms, measurements, and other data to a user. In some embodiments, a main output display of the user interface 114 may also be located remote from the instrument 102.

The test and measurement instrument 102 further includes one or more measurement units 116 that perform the functions of measuring parameters and other qualities of the signals from a DUT being measured or tested by the instrument 102. Typical measurements include measuring voltage, current, and power of signals in the time domain, as well as measuring features of the signals in the frequency domain. The measurement units 116 represent any measurements that are performed on test and measurement instruments, and the instrument controller 106 may be coupled to or integrated within the measurement units 116 or other components of the instrument 102. The test and measurement instrument 104 similarly includes processors 118, memory 120, a user interface 122, and measurements units 124, each of which functions in the same way as the corresponding components described above in relation to the test and measurement instrument 102.

As mentioned above, the size of the acquired test data may be very large, including gigabytes of test data, and the high-bandwidth communication link HBCL has the bandwidth required to make timely transfers of this test data from the secondary test and measurement instrument 104 to the primary test and measurement instrument 102. For example, in some embodiments of the present disclosure, the high-bandwidth communication link HBCL is a peripheral component interconnect express (PCIe) bus providing very high bandwidth for the transfer of test data over the high-bandwidth communication link HBCL. The term "high bandwidth" as used in the present context may be, for example, where the PCIe bus is version PCIe 6.0, and the PCIe bus may include up to thirty-two (32) lanes, communication over each lane at a rate of 64 GT/s (GT=Gigatransfers per second). In further embodiments of the test and measurement system 100, the high-bandwidth communication link HBCL may be other types of high-bandwidth communication links implementing other protocols such as the Ethernet protocol or the universal serial bus (USB) protocol.

In addition to its high bandwidth properties, the high-bandwidth communication link HBCL needs to communicate via a protocol that is highly efficient, meaning that a large percentage of each transmitted message segment is reserved for data being sent between the secondary test and measurement instrument 104 and the primary test and measurement instrument 102.

While having an efficient, high bandwidth communication protocol, the latency between messages of the high-bandwidth communication link HBCL may be too large to allow for desired control of the secondary test and measurement instrument 104 by the primary test and measurement instrument 102. Moreover, even if the latency of the high-bandwidth communication link HBCL were sufficiently low, the utilization of the high-bandwidth communication link HBCL to transfer the large amounts of acquired test data from the secondary test and measurement instrument 104 likely means the high-bandwidth communication link HBCL is either saturated, meaning the high-bandwidth communication link HBCL is active 100% of the time to transfer acquired test data, or the latency of spaces in the data stream of the high-bandwidth communication link HBCL, where control commands may be placed, is very high.

One approach to attempting to resolve the high latency issue of high-bandwidth communication links in test and measurement systems is to design a custom high-bandwidth communication link having a reduced latency. Manufacturers of test and measurement instruments in the test and measurement industry may not, however, have specialized expertise in designing high-bandwidth communication links. Moreover, a fast time-to-market for new test and measurement system functionality is increasingly becoming an important goal in the industry, meaning there is less time for the independent design of new components of such systems. Another approach to resolve the high latency issue of high-bandwidth communication links is to modify or customize a communications protocol implemented through a third-party IP core to reduce latency of the communication link implemented by the IP core. This approach is not typically a viable option. When using a third-party IP core, such as the PCIe bus mentioned above, the IP core typically cannot be modified due to prohibitions against doing so by the terms of the license agreement under which the IP core is licensed from the third-party. To ensure these licensing provisions against modification are not violated, software portions of a licensed third-party IP core are typically encrypted.

The dual-band communication link DBCL overcomes these issues by providing the low-latency communication link LLCL, which is independent of the high-bandwidth communication link HBCL. This independence enables the primary test and measurement instrument 102 to provide control commands to the secondary test and measurement instrument 104 whenever needed to control the desired operation of the secondary test and measurement instrument 104. In this way, the dual-band communication link DBCL satisfies the need in test and measurement systems for both high-bandwidth communication to transfer large amounts of data and low-latency to control the operation of test and measurement instruments in the system. Moreover, dual-band communication link DBCL eliminates the need for a new custom designed communications link. Instead, third-party IP cores may be used for the high-bandwidth communication link HBCL, enabling manufacturers of test and measurement systems to combine IP cores from various vendors and integrate these IP cores at a higher level to achieve new system technical requirements while also achieving desired time-to-market or scheduling goals. In the embodiments of the disclosure, the low-latency communication link LLCL may be a custom-designed communications link utilizing a custom low-overhead communications protocol to achieve the desired low latency for the link. Alternatively, the low-latency communication link LLCL may implement a standard low-overhead protocol communication link, such as a serial communication link including a universal asynchronous receiver-transmitter (UART) or a serial communication link including a serial peripheral interface (SPI).

In general, during operation of the dual-band communication link DBCL, the low-latency communication link LLCL is not continuously active like the high-bandwidth communication link HBCL is active. The low-latency communication link LLCL allows either the primary test and measurement instrument 102 to issue control commands to the secondary test and measurement instrument 104 or allow the reverse to occur as necessary for the specific applications. Such commands may be timed with sections of the data transferring between the test and measurement instruments 102, 104 over the high-bandwidth communication link HBCL, or may happen asynchronously to that data. As long as the commands are always able to be issued as necessary, additional data may also be transferred over the low-latency communication link LLCL for either instrument to use.

In some embodiments, each of the high-bandwidth communication link HBCL and low-latency communication link LLCL provides bi-directional communication between the primary test and measurement instrument 102 and the secondary test and measurement instrument 104. Moreover, in some embodiments, test data may be acquired by each of the first and second test and measurement instrument 102, 104 and communicated over the high-bandwidth communication link HBCL to the other first and second test and measurement instrument 102, 104. Similarly, control commands may be communicated over the low-latency communication link LLCL from each first and second test and measurement instrument 102, 104 to the other first and second test and measurement 102, 104. Bi-directional communication over each of the high-bandwidth communication link HBCL and low-latency communication link LLCL enables test data and control commands to be communicated in both directions over these communication links. This bi-directional communication also enables any required communication associated with a protocol being implemented on the each of the communication links HBCL, LLCL, such as communication related to handshaking, error correction, or other features of a particular protocol being utilized. The low-latency communication link LLCL provides, in embodiments, for bi-directional communication between the first and second test and measurement instruments 102, 104, where this bi-directional communication may include the communication of status information or responses to control commands being communicated from the second test and measurement instrument 104 to the first test and measurement instrument 102.

The transfer rate, bit rate, or baud rate of the high-bandwidth communication link HBCL is significantly higher than the bandwidth of the low-latency communication link LLCL. In the low-latency communication link LLCL, the total time to transfer a packet including a message or command is small relative to the total time to include the message or command in a packet over the high-bandwidth communication link HBCL. This operation of the low-latency communication link LLCL may be achieved either by small packets, fast transfer rates, or both or both small packets and fast transfer rates. The "fast transfer rates" of the low-latency communication link LLCL are fast enough to achieve the required low latency for the low-latency communication link but significantly less than the transfer rates of the high-bandwidth communication link HBCL, as previously described.

In further embodiments of the present disclosure, the test and measurement system 100 includes additional test and measurement instruments (not shown in FIG. 1) coupled to the dual-band communication link DBCL to transfer test data acquired from each of these additional test and measurement instruments to the primary test and measurement instrument 102. An embodiment including multiple additional test and measurement instruments is described in more detail below with reference to FIG. 3. In still further embodiments of the present disclosure, any of the test and measurement instruments coupled to the dual-band communication link DBCL may function as either the primary test and measurement instrument or a secondary test and measurement instrument. In yet further embodiments of the present disclosure, the instrument controller of a test and measurement instrument may be coupled through additional dual-band communication links to still further test and measurement instruments. In sum, the test and measurement system 100 may have different topologies in further embodiments of the disclosure, with test and measurement instruments in these different topologies being interconnected through dual-band communication links DBCL.

Figure 2:
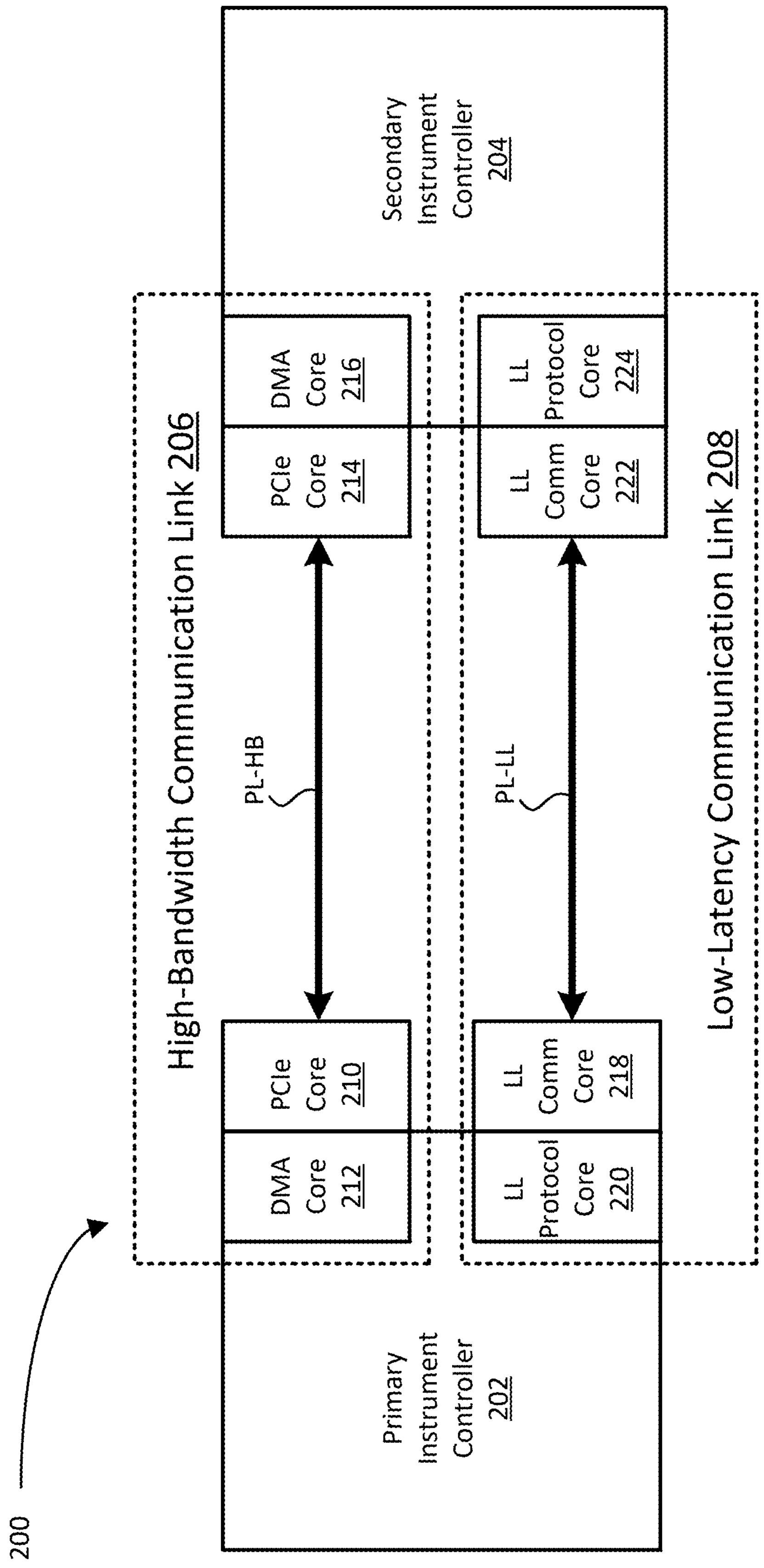
FIG. 2 is a block diagram illustrating in more detail the dual-band communication link of FIG. 1 in accordance with embodiments of the disclosure.

FIG. 2 is a block diagram illustrating in more detail a dual-band communication link 200 in accordance with embodiments of the disclosure. The dual-band communication link 200 corresponds to one embodiment of the dual-band communication link DBCL of FIG. 1. The dual-band communication link 200 includes a primary instrument controller 202 and a secondary instrument controller 204, which are contained, respectively, in primary and secondary test and measurement instruments (not shown in FIG. 2). The primary and secondary instrument controllers 202, 204 are described as being part of or contained in the dual-band communication link 200 in the present description since a portion or component of each of these instrument controllers 202, 204, as illustrated in FIG. 2, is directed to implementing the dual-band communication link 200. These instrument controllers 202, 204 may, however, be considered separate from and not included in the dual-band communication link 200 in embodiments of the disclosure. The dual-band communication link 200 includes a high-bandwidth communication link 206 and a low-latency communication link 208 coupled between the primary and secondary instrument controllers 202, 204. The high-bandwidth communication link 206 and low-latency communication link 208 include respective physical links PL-HB and PL-LL, each of which represents a physical communication media for the corresponding communication link, such as conductive wires or optical cables.

The high-bandwidth communication link 206 includes a high-bandwidth communication core 210 coupled to a first end of the physical link PL-HB and configured to transmit and receive electrical signals over the physical link PL-HB to communicate test data. The high-bandwidth communication core 210 is a PCIe core in the embodiment of FIG. 2. A high-bandwidth data transfer core 212 in the primary instrument controller 202 is coupled to the PCIe core 210 to receive test data from the PCIe core and to store the test data in a memory (not shown) contained in the primary instrument controller 202. The high-bandwidth data transfer core 212 is a direct memory access (DMA) core and each of the DMA core 212 and PCIe core 210 is a third-party IP core in the embodiment of FIG. 2.

The high-bandwidth communication link 206 includes corresponding IP core components at the other end of the physical link PL-HB coupled to the secondary instrument controller 204. More specifically, the high-bandwidth communication link 206 further includes a high-bandwidth communication core 214 coupled to a second end of the physical link PL-HB and configured to transmit and receive electrical signals over the physical link PL-HB to communicate test data over the physical link PL-HB. The high-bandwidth communication core 214 is a PCIe core in the embodiment of FIG. 2 and is coupled to a high-bandwidth data transfer core 216 in the secondary instrument controller 204. The high-bandwidth data transfer core 216 receives test data from a memory (not shown) contained in secondary test and measurement instrument (not shown) and provides the received test data to the PCIe core 214 which, in turn, generates electrical signals to communicate the test data over the physical link PL-HB to the PCIe core 210. Once again, the high-bandwidth data transfer core 216 is a direct memory access (DMA) core and each of the DMA core 216 and PCIe core 214 is a third-party IP core in the embodiment of FIG. 2. Each of the IP cores 210-216 may be implemented in an FPGA or an application specific integrated circuit (ASIC) in embodiments of the disclosure.

The low-latency communication link 208 includes a low-latency communication core 218 coupled to a first end of the physical link PL-LL and configured to transmit and receive electrical signals over the physical link PL-LL to communicate control commands to control the operation of the secondary test and measurement instrument (not shown) including the secondary instrument controller 204. The low-latency communication core 218 is configured to receive control commands from a low-latency protocol core 220 and to generate corresponding electrical signals to communicate the control commands over the physical link PL-LL to the secondary instrument controller 204. The low-latency communication core 218 may, for example, be a custom communication core designed to implement a low-overhead communications protocol. A manufacturer of the test and measurement instruments (not shown in FIG. 2) including the primary and secondary controllers 202, 204 may design the low-latency communication core 218 to implement a low-overhead communication protocol having the desired low latency required for the low-latency communication link 208.

The low-latency protocol core 220 is contained in the primary instrument controller 202 in the embodiment of FIG. 2 and is configured to receive control command instructions and to generate, from the control command instructions, control commands to be communicated over the physical link PL-LL of the low-latency communication link 208. The primary instrument controller 202 provides the control command instructions, to the low-latency protocol core 220, and in response to the control command instructions the low-latency protocol core generates control command packets using the low-overhead communication protocol of the low-latency communication link 208. The control command packets include a control command to be communicated from the primary instrument controller 202 to the secondary instrument controller 204. The operation or configuration of the test and measurement instrument (not shown in FIG. 2) including the secondary instrument controller 204 is adjusted through the applied control command.

In this way, the primary instrument controller 202 supplies control command instructions to the low-latency protocol core 220 to control the operation of the secondary test and measurement instrument (not shown) including the secondary instrument controller 204.

The low-latency communication link 208 includes corresponding IP core components at the other end of the physical link PL-LL coupled to the secondary instrument controller 204. More specifically, the low-latency communication link 208 further includes a low-latency communication core 222 coupled to a second end of the physical link PL-LL and a low-latency protocol core 224 coupled to the low-latency communication core. The low-latency communication core 222 receives the electrical signals corresponding to the control command being communicated over the physical link PL-LL and decodes these electrical signals into bits of a control command. The low-latency communication core 222 supplies these decoded bits to the low-latency protocol core 224, which is contained in the secondary instrument controller 204. The low-latency protocol core 224 generates the corresponding control command packets from the received bits and provides a corresponding control command to the secondary instrument controller 204. In response to the control command from the low-latency protocol core 224, the secondary instrument controller 204 then controls the operation or configuration of the secondary test and measurement instrument (not shown) including the secondary instrument controller. In the embodiment of the low-latency communication link 208 of FIG. 2, the low-latency communication cores 218, 220 may be implemented in respective FPGAs. Each of the low-latency protocol cores 220, 224 may also be implemented through an FPGA or through an ASIC. Furthermore, although the operation of the low-latency communication link 208 is described as communicating control commands from the primary instrument controller 202 to the secondary instrument controller 204, other data or commands may be communicated over this link in some embodiments of the present disclosure.

The dual-band communication link 200 enables the primary instrument controller 202 to identify or select which communication link to use, the high-bandwidth communication link 206 or low-latency communication link 208, for communication with the secondary instrument controller 204. In operation, the primary instrument controller 202 initially determines whether a communication is to be performed over the high-bandwidth communication link 206 or the low-latency communication link 208. When a DMA transfer of test data is to be performed, the primary instrument controller 202 determines the high-bandwidth communication link 206 is to be used for the communication. The DMA core 212, PCIe core 210 and DMA core 216, PCIe core 214 thereafter operate in combination to transfer test data stored in the secondary instrument controller 204 over the high-bandwidth communication link 206 and store this test data in the primary instrument controller 202. Conversely, when a reconfiguration or other control of the secondary instrument controller 204 is required, the primary instrument controller 202 determines the low-latency communication link 208 is to be used to send a control command to the secondary instrument controller 204. The LL protocol core 220, LL communication core 218 and LL protocol core 224, LL communication core 222 then operate in combination to apply the control command over the low-latency communication link 208 to the secondary instrument controller 204, which, in turn, reconfigures or adjusts control of the secondary test and measurement instrument in response to the control command.

In this way, both communication links 206, 208 are available for use by the primary instrument controller 202. In some embodiments of the disclosure, communications of test data and control commands may occur in both directions on the dual-band communication link 200, namely from the primary instrument controller 202 to the secondary instrument controller 204 and from the secondary instrument controller to the primary instrument controller. In such embodiments, each of the primary and secondary instrument controllers 202, 204 may determine which of the communication links 206, 208 in the dual-band communication link 200 to use in communicating with the other instrument controller. Furthermore, in embodiments of the disclosure, both of the communication links 206, 208 may operate at the same time to communicate test data and control commands between the instrument controllers 202, 204.

Figure 3:
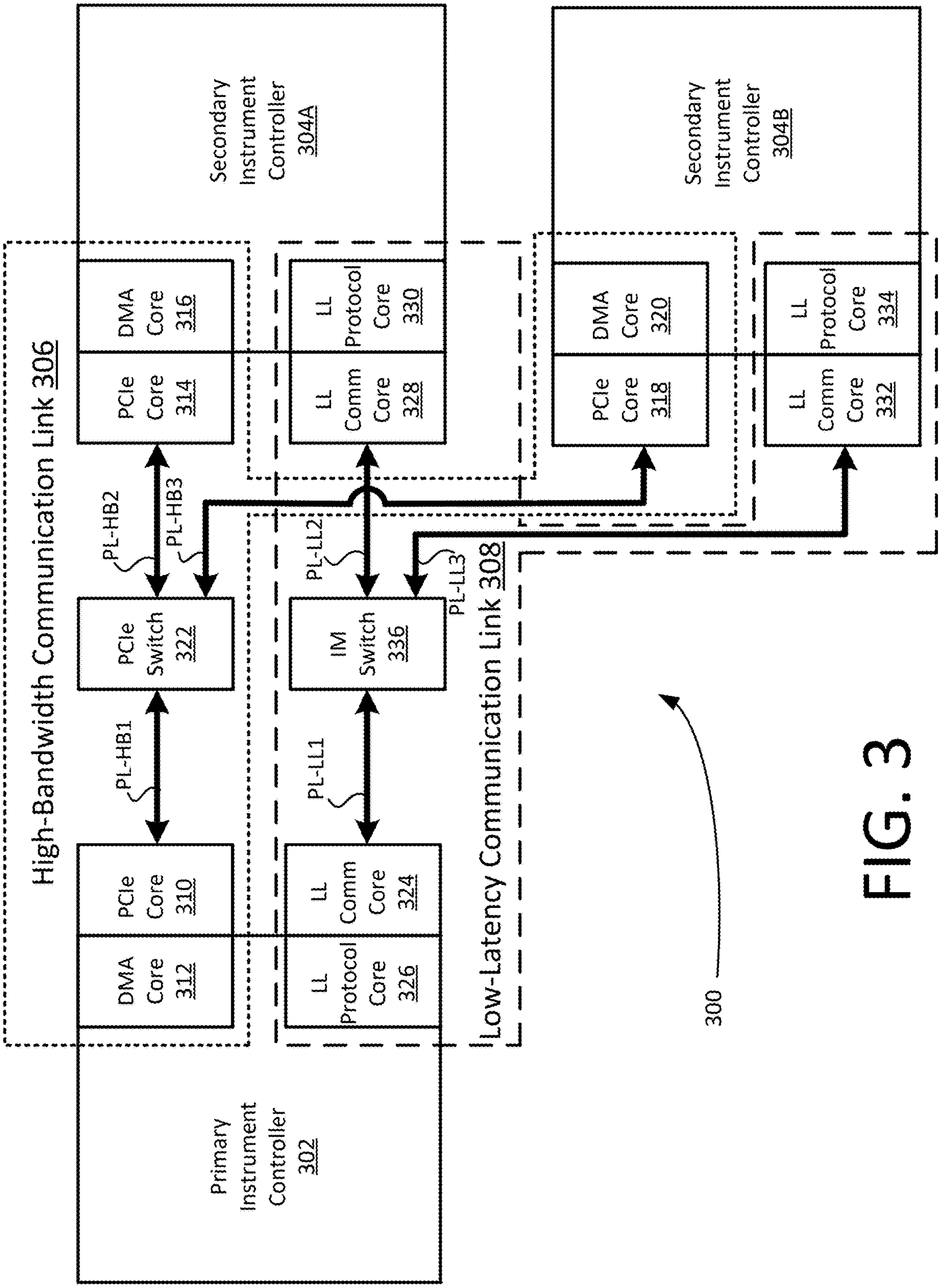
FIG. 3 is a block diagram illustrating in more detail the dual-band communication link of FIG. 1 in accordance with further embodiments of the disclosure.

FIG. 3 is a block diagram illustrating in more detail a dual-band communication link 300 in accordance with further embodiments of the disclosure. The dual-band communication link 300 corresponds to an embodiment of the dual-band communication link DBCL of FIG. 1. The dual-band communication link 300 includes a primary instrument controller 302 coupled to multiple secondary instrument controllers 304A, 304B through the dual-band communication link 300. More specifically, the dual-band communication link 300 includes a high-bandwidth communication link 306 and low-latency communication link 308, each of which includes an intermediary switch to couple multiple secondary instrument controllers 304A, 304B to the primary instrument controller 302. The high-bandwidth communication link 306 includes a PCIe bus in the embodiment of FIG. 3 and accordingly includes a DMA core and PCIe core associated with each of the instrument controllers 302, 304A, 304B. Thus, the high-bandwidth communication link 306 includes a PCIe core 310 and DMA core 312 on one end of the communication link coupled to the primary instrument controller 302 and includes the PCIe core 314 and the DMA core 316 associated with the secondary instrument controller 304A and the PCIe core 318 and the DMA core 320 associated with the secondary instrument controller 304B on opposing ends of the communication link.

An intermediate switch 322, which is a PCIe switch in the embodiment of FIG. 3, is coupled through a first physical link PL-HB1 of the high-bandwidth communication link 306 to the primary instrument controller 302. Each of the secondary instrument controllers 304A, 304B is coupled through a respective physical link PL-HB2, PL-HB3 to the PCIe switch 322. Additional secondary instrument controllers (not shown) may be coupled through additional physical links to the PCIe switch 322, with the two secondary instrument controllers 304A, 304B being illustrated by way of example in the embodiment of FIG. 3.

In operation, the primary instrument controller 302 supplies a command, through the DMA core 312 and PCIe core 310 to the PCIe switch 322 to select a desired one of the secondary instrument controllers 304A, 304B for communication. This selection effectively results in a high-bandwidth communication link being formed between the primary instrument controller 302 and the selected one of the secondary instrument controllers 304A, 304B. The high-bandwidth communication link between the primary instrument controller 302 and the selected secondary instrument controller 304A, 304B thereafter operates as described above for the high-bandwidth communication link 206 of FIG. 2. Thus, the PCIe core 310, DMA core 312 and either the PCIe core 314, DMA core 316 or PCIe core 318, DMA core 320 associated with the selected secondary instrument controller 304A or 304B operate in the same way as described above for the PCIe core 210, DMA core 212 and PCIe core 214, DMA core 216 in the high-bandwidth communication link 206 of FIG. 2.

The low-latency communication link 308 includes a low-latency communication core 324 and low-latency (LL) protocol core 326 on one end of the low-latency communication link coupled to the primary instrument controller 302 and LL communication core 328 and LL protocol core 330 associated with the secondary instrument controller 304A and LL communication core 332 and LL protocol core 334 associated with secondary instrument controller 304B. An intermediate switch 336 is coupled through a first physical link PL-LL1 of the low-latency communication link 308 to the primary instrument controller 302. Each of the secondary instrument controllers 304A, 304B is coupled through a respective physical link PL-LL2, PL-LL3 to the intermediate switch 336. Once again, additional secondary instrument controllers (not shown) may be coupled through additional physical links to the intermediate switch 336, with the two secondary instrument controllers 304A, 304B being illustrated merely by way of example.

In operation, the primary instrument controller 302 supplies a command, through the LL protocol core 326 and LL communication core 324, to the intermediate switch 336 to select a desired one of the secondary instrument controllers 304A, 304B for communication. This selection effectively results in a low-latency communication link being formed between the primary instrument controller 302 and the selected one of the secondary instrument controllers 304A, 304B. The low-latency communication link between the primary instrument controller 302 and the selected secondary instrument controller 304A, 304B thereafter operates as described above for the low-latency communication link 208 of FIG. 2. Thus, the LL protocol core 326, LL communication core 324 and either the LL protocol core 330, communication core 328 or LL protocol core 334, LL communication core 332 associated with the selected secondary instrument controller 304A or 304B operate in the same way as described above for the LL protocol core 220, LL communication core 218, LL protocol core 224, LL communication core 222 in the low-latency communication link 208 of FIG. 2.

Figure 4:
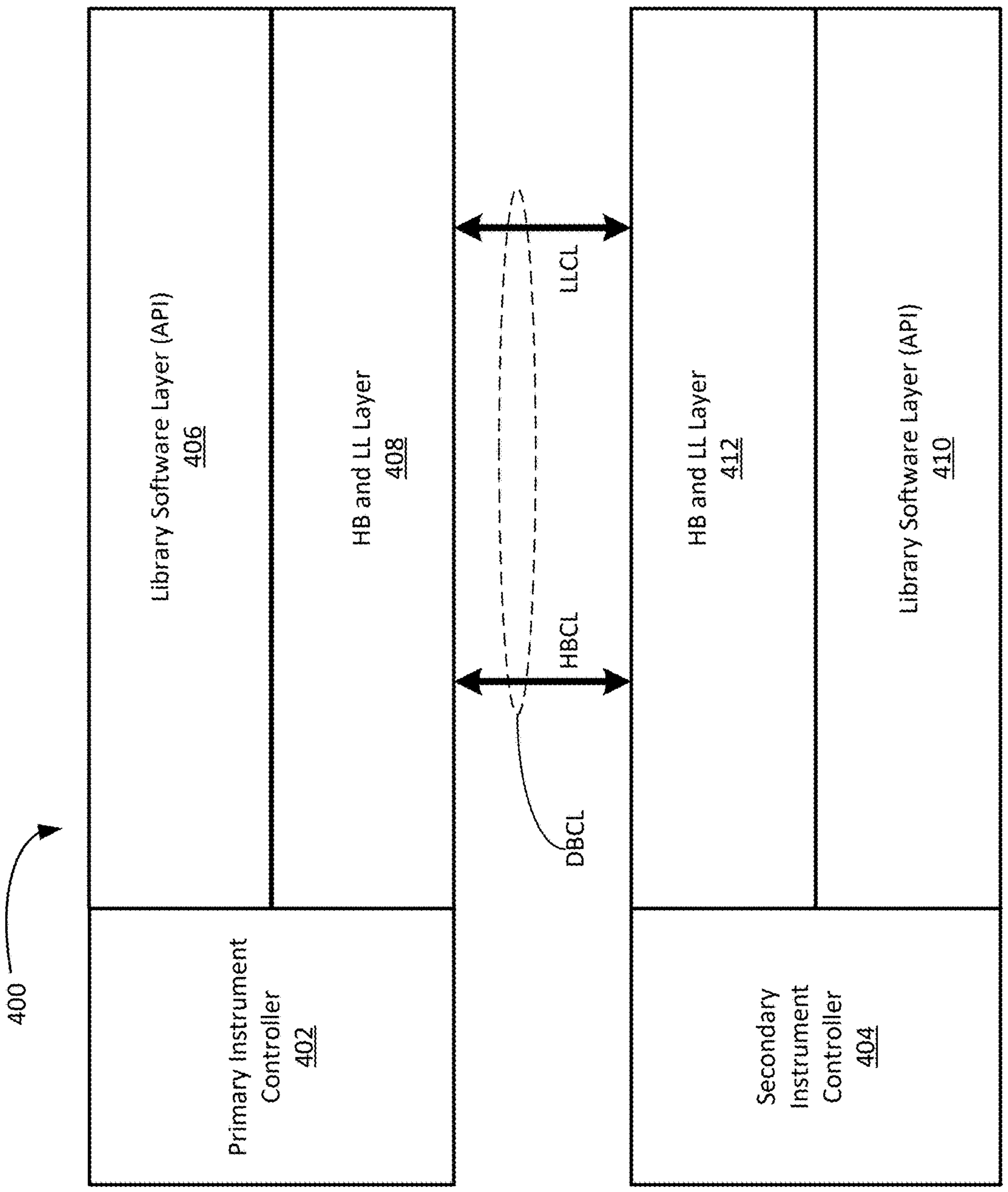
FIG. 4 is a diagram illustrating communication layers implemented in the primary and secondary instrument controllers of FIG. 2 or 3 in accordance with embodiments of the disclosure.

FIG. 4 is a diagram illustrating software layers 400 implemented in a primary instrument controller 402 and a secondary instrument controller 404 coupled through dual-band communication link DBCL in accordance with embodiments of the disclosure. The primary instrument controller 402 corresponds to the primary instrument controller 202 or 302 in the embodiments of FIGS. 2 and 3 and the secondary instrument controller 404 corresponds to the secondary instrument controller 204 of FIG. 2 or any of the secondary instrument controllers 304A, 304B of FIG. 3. The primary instrument controller 402 includes a library software layer 406, which may be an application programming interface (API) in embodiments of the disclosure, and which determines whether to a use a high-bandwidth communication link HBCL or low-latency communication link LLCL of the dual-band communication link DBCL for communication with the secondary instrument controller 404.

The library software layer 406 communicates with higher layers of software (e.g., application programs; not shown in FIG. 4) executing on the primary instrument controller 402 to enable these software programs to treat the dual-band communication link DBCL as a single communication link providing communication with the secondary instrument controller 404. In operation, a software program (not shown) executing on the primary instrument controller provides an instruction for communication to the library software layer 406. This instruction includes information enabling the library software layer 406 to determine whether the high-bandwidth communication link HBCL or low-latency communication link LLCL is used for communication with the secondary instrument controller 404. The library software layer 406 then communicates with a high-bandwidth (HB) and low-latency (LL) layer 408 which, in turn, controls communication over the selected high-bandwidth or low-latency communication link HBCL, LLCL of the dual-band communication DBCL. The HB and LL layer 408 communicates with corresponding IP cores of the dual-band communication link DBCL (e.g., PCIe core 210 and DMA core 212 or LL communication core 218 and LL protocol core 220 of FIG. 2) to perform the desired communication over the selected one of the high-bandwidth or low-latency communication link HBCL, LLCL. The secondary instrument controller 404 includes a library software layer 410 and HB and LL layer 412 that operate in the same way to facilitate communication with the primary instrument controller 402 over the dual-band communication link DBCL.

Figure 5:
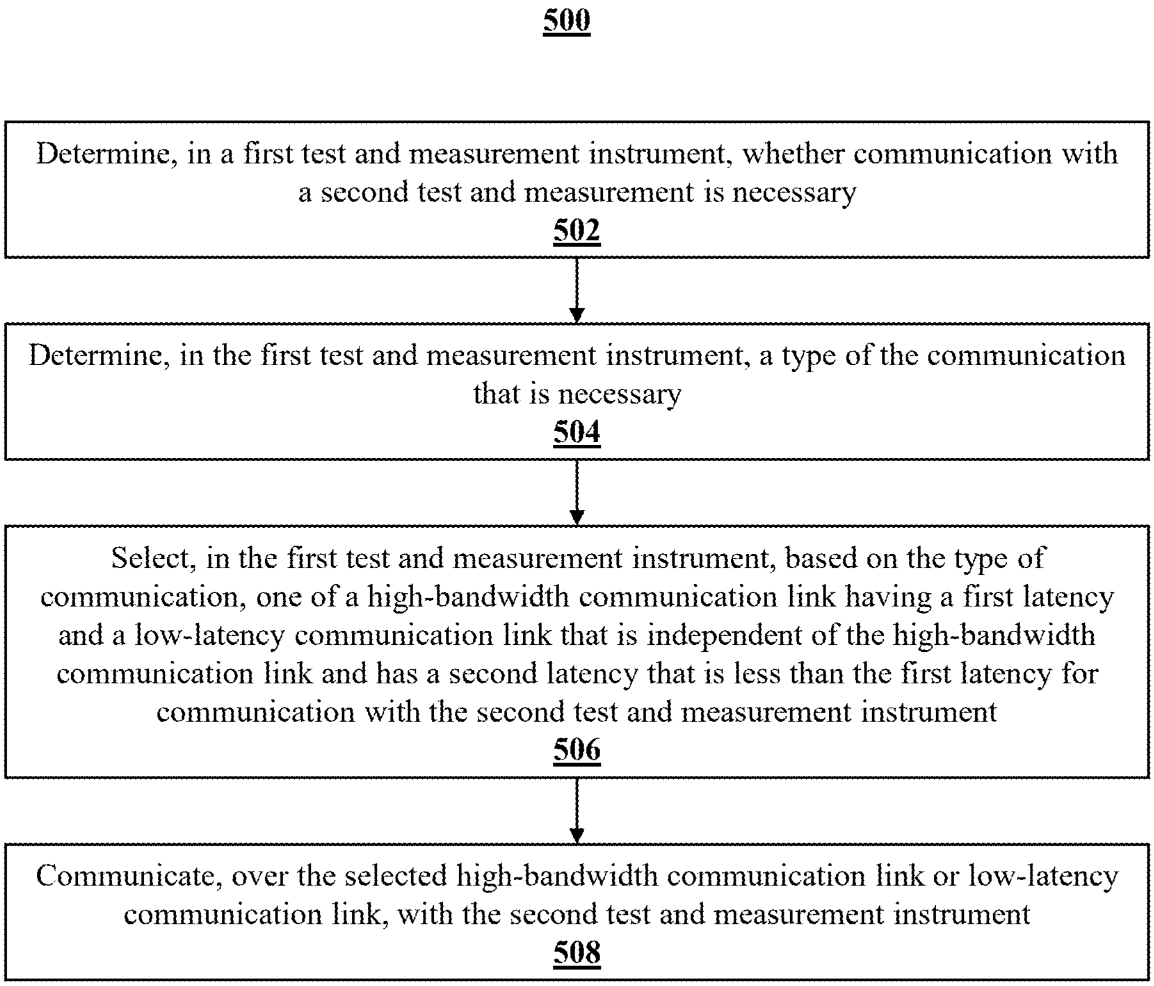
FIG. 5 is a flowchart of a process that may be implemented in test and measurement systems in accordance with embodiments of the present disclosure.

FIG. 5 is a flowchart of a process 500 that may be implemented in test and measurement systems in accordance with embodiments of the present disclosure. The process 500 is now described with reference to the dual-band communication link 200 of FIG. 2. The process 500 begins at operation 502 and determines, in a first test and measurement instrument (e.g., the primary test and measurement instrument 202) whether communication with a second test and measurement instrument (e.g., secondary test and measurement instrument 204) is necessary. The process 500 then proceeds to operation 504 and determines, in the first test and measurement instrument, a type of the communication that is appropriate. The type of communication is, for example, a transfer of test data from the second test and measurement instrument to the first test and measurement instrument or applying a control command to the second test and measurement instrument. The process 500 then goes to operation 506 and selects, in the first test and measurement instrument 202, one of the high-bandwidth communication link 206 and low-latency communication link 208. The selection is based on the type of communication. The high-bandwidth communication link 206 has a first latency and the low-latency communication link 208, which is independent of the high-bandwidth communication link 206, has a second latency that is less than the first latency.

From operation 506 the process 500 proceeds to operation 508 and the primary test and measurement instrument 202 communicates, over the selected high-bandwidth communication link 206 or low-latency communication link 208, with the secondary test and measurement instrument 204. In embodiments of the process 500, when the type of communication is a transfer of test data from the secondary test and measurement instrument 204 to the primary test and measurement instrument 202, the primary test and measurement instrument selects the high-bandwidth communication link 206 in operation 506 and performs communication with the secondary test and measurement instrument over the high-bandwidth communication link in operation 508. When the type of communication is applying a control command to the secondary test and measurement instrument 204, the primary test and measurement instrument 202 selects the low-latency communication link 208 in operation 506 and performs communication with the secondary test and measurement instrument over the low-latency communication link in operation 508.

Aspects of the disclosure may operate on a particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. A configuration of the technologies may include any one or more, and any combination of, the examples described below.

Example 1 is a test and measurement system including a first test and measurement instrument, a second test and measurement instrument; and a dual-band communication link coupled between the first test and measurement instrument and the second test and measurement instrument, the dual-band communication link including a high-bandwidth communication link having a first latency to transfer test data between the first test and measurement instrument and the second test and measurement instrument and including a low-latency communication link that is independent of the high-bandwidth communication link, the low-latency communication link having a second latency that is less than the first latency to transfer control commands between the first test and measurement instrument and the second test and measurement instrument.

Example 2 is the test and measurement instrument of Example 1, where the test and measurement system of Example 1 further includes a first instrument controller in the first test and measurement instrument, the first instrument controller configured to identify one of the high-bandwidth communication link and the low-latency communication link for communication with the second test and measurement instrument, and further configured to initiate communication over the identified one of the high-bandwidth communication link and low-latency communication link; and a second instrument controller in the second test and measurement instrument, the second instrument controller configured to identify one of the high-bandwidth communication link and the low-latency communication link for communication with the first test and measurement instrument, and further configured to initiate communication over the identified one of the high-bandwidth communication link and low-latency communication link.

Example 3 is the test and measurement instrument of Example 2, wherein the first instrument controller is configured to identify the high-bandwidth communication link for communication with the second test and measurement instrument when test data acquired by the second test and measurement instrument is to be transferred to the first test and measurement instrument, and wherein the second instrument controller is configured to identify the high-bandwidth communication link for communication with the first test and measurement instrument when test data acquired by the first test and measurement instrument is to be transferred to the second test and measurement instrument.

Example 4 is the test and measurement instrument of Example 2, wherein the first instrument controller is configured to identify the low-latency communication link for communication with the second test and measurement instrument when the first instrument controller determines a control command is to be communicated to the second test and measurement instrument.

Example 5 is the test and measurement instrument of Example 2, wherein the high-bandwidth communication link is one of a peripheral component interconnect express (PCIe) communication link, a universal serial bus (USB) communication link, and an Ethernet communication link.

Example 6 is the test and measurement instrument of Example 5, wherein the first instrument controller includes a direct memory access (DMA) core and the high-bandwidth communication link includes a PCIe core, the DMA core and PCIe core configured to operate in combination to communicate test data acquired by the second test and measurement instrument over the PCIe communication link and store the test data in the first test and measurement instrument.

Example 7 is the test and measurement instrument of Example 2, wherein the low-latency communication link comprises one of a serial communication link including a universal asynchronous receiver-transmitter (UART) or a serial communication link including a serial peripheral interface (SPI).

Example 8 is the test and measurement instrument of Example 2, wherein the first instrument controller includes a low-latency protocol core and the low-latency communication link includes a low-latency communication core, the low-latency protocol core and low-latency communication core configured to operate in combination to communicate control commands over the low-latency communication link to the second test and measurement instrument.

Example 9 is the test and measurement instrument of Example 8, wherein the low-latency communication link includes one of a field programmable gate array (FPGA) and an application specific integrated circuit (ASIC) configured to implement the low-latency communication core.

Example 10 is the test and measurement instrument of Example 1 further comprising one or more additional test and measurement instruments coupled to the first test and measurement instrument through the dual-band communication link.

Example 11 is the test and measurement instrument of Example 10, wherein each of the high-bandwidth communication link and low-latency communication link includes a switch configured to couple the second test and measurement instrument and the one or more additional test and measurement instruments to the first test and measurement instrument.

Example 12 is the test and measurement instrument of Example 11, wherein the high-bandwidth communication link is a peripheral component interconnect express (PCIe) communication link and the switch in the high-bandwidth communication link is a PCIe switch.

Example 13 is the test and measurement instrument of Example 12, wherein the low-latency communication link further comprises one of a field programmable gate array (FPGA) and an application specific integrated circuit (ASIC) that implements the switch of the low-latency communication link.

Example 14 is the test and measurement instrument of Example 1, where at least one of the first and second test and measurement instruments is an oscilloscope.

Example 15 is a method including: determining, in a first test and measurement instrument, whether communication with a second test and measurement is necessary; determining, in the first test and measurement instrument, a type of the communication that is necessary; selecting, in the first test and measurement instrument, based on the type of communication, one of a high-bandwidth communication link having a first latency coupled between the first and second test and measurement instruments and a low-latency communication link also coupled between the first and second test and measurement instruments that is independent of the high-bandwidth communication link and has a second latency that is less than the first latency for communication with the second test and measurement instrument; and communicating, over the selected high-bandwidth communication link or low-latency communication link, with the second test and measurement instrument.

Example 16 is the method of Example 15, wherein the type of communication is one of a transfer of test data between the first test and measurement instrument and the second test and measurement instrument and a control command to be communicated between first test and measurement instrument and the second test and measurement instrument.

Example 17 is the method of Example 16, wherein selecting further includes: selecting the high-bandwidth communication link when the type of communication is the transfer of test data between the first test and measurement instrument and the second test and measurement instrument; and selecting the low-latency communication link when the type of communication is a control command to be communicated between the first test and measurement instrument and the second test and measurement instrument.

Example 18 is a test and measurement system, including: a first test and measurement instrument; a plurality of additional test and measurement instruments; and a dual-band communication link coupled between the first test and measurement instrument and the plurality of additional test and measurement instruments, the dual-band communication link configured to provide a high-bandwidth communication link having a first latency to transfer test data between the first test and measurement instrument and each of the plurality of additional test and measurement instruments, and the dual-band communication link further configured to provide a low-latency communication link that is independent of the high-bandwidth communication link, the low-latency communication link having a second latency that is less than the first latency to communicate control commands between the first test and measurement instrument and each of the plurality of additional test and measurement instruments.

Example 19 is the test and measurement system of Example 18, where each of the high-bandwidth communication link and the low-latency communication link comprises an intermediary switch coupled between the first test and measurement instrument and each of the plurality of additional test and measurement instruments.

Example 20 is the test and measurement system of Example 18, wherein the first test and measurement instrument and each of the plurality of additional test and measurement instruments is an oscilloscope.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A test and measurement system, comprising:

a first test and measurement instrument;

a second test and measurement instrument; and a dual-band communication link coupled between the first test and measurement instrument and the second test and measurement instrument, the dual-band communication link including a high-bandwidth communication link having a first latency to transfer test data between the first test and measurement instrument and the second test and measurement instrument and including a low-latency communication link that is independent of the high-bandwidth communication link, the low-latency communication link having a second latency that is less than the first latency to transfer control commands between the first test and measurement instrument and the second test and measurement instrument.

2. The test and measurement system of claim 1 further comprising:

a first instrument controller in the first test and measurement instrument, the first instrument controller configured to identify one of the high-bandwidth communication link and the low-latency communication link for communication with the second test and measurement instrument, and further configured to initiate communication over the identified one of the high-bandwidth communication link and low-latency communication link; and a second instrument controller in the second test and measurement instrument, the second instrument controller configured to identify one of the high-bandwidth communication link and the low-latency communication link for communication with the first test and measurement instrument, and further configured to initiate communication over the identified one of the high-bandwidth communication link and low-latency communication link.

3. The test and measurement system of claim 2, wherein the first instrument controller is configured to identify the high-bandwidth communication link for communication with the second test and measurement instrument when test data acquired by the second test and measurement instrument is to be transferred to the first test and measurement instrument, and wherein the second instrument controller is configured to identify the high-bandwidth communication link for communication with the first test and measurement instrument when test data acquired by the first test and measurement instrument is to be transferred to the second test and measurement instrument.

4. The test and measurement system of claim 2, wherein the first instrument controller is configured to identify the low-latency communication link for communication with the second test and measurement instrument when the first instrument controller determines a control command is to be communicated to the second test and measurement instrument.

5. The test and measurement system of claim 2, wherein the high-bandwidth communication link is one of a peripheral component interconnect express (PCIe) communication link, a universal serial bus (USB) communication link, and an Ethernet communication link.

6. The test and measurement system of claim 5, wherein the first instrument controller includes a direct memory access (DMA) core and the high-bandwidth communication link includes a PCIe core, the DMA core and PCIe core configured to operate in combination to communicate test data acquired by the second test and measurement instrument over the PCIe communication link and store the test data in the first test and measurement instrument.

7. The test and measurement system of claim 2, wherein the low-latency communication link comprises one of a serial communication link including a universal asynchronous receiver-transmitter (UART) or a serial communication link including a serial peripheral interface (SPI).

8. The test and measurement system of claim 2, wherein the first instrument controller includes a low-latency protocol core and the low-latency communication link includes a low-latency communication core, the low-latency protocol core and low-latency communication core configured to operate in combination to communicate control commands over the low-latency communication link to the second test and measurement instrument.

9. The test and measurement system of claim 8, wherein the low-latency communication link includes one of a field programmable gate array (FPGA) and an application specific integrated circuit (ASIC) configured to implement the low-latency communication core.

10. The test and measurement system of claim 1 further comprising one or more additional test and measurement instruments coupled to the first test and measurement instrument through the dual-band communication link.

11. The test and measurement system of claim 10, wherein each of the high-bandwidth communication link and low-latency communication link includes a switch configured to couple the second test and measurement instrument and the one or more additional test and measurement instruments to the first test and measurement instrument.

12. The test and measurement system of claim 11, wherein the high-bandwidth communication link is a peripheral component interconnect express (PCIe) communication link and the switch in the high-bandwidth communication link is a PCIe switch.

13. The test and measurement system of claim 12, wherein the low-latency communication link further comprises one of a field programmable gate array (FPGA) and an application specific integrated circuit (ASIC) that implements the switch of the low-latency communication link.

14. The test and measurement system of claim 1, where at least one of the first and second test and measurement instruments is an oscilloscope.

15. A method, comprising:

determining, in a first test and measurement instrument, whether communication with a second test and measurement is necessary;

determining, in the first test and measurement instrument, a type of the communication that is necessary;

selecting, in the first test and measurement instrument, based on the type of communication, one of a high-bandwidth communication link having a first latency coupled between the first and second test and measurement instruments and a low-latency communication link also coupled between the first and second test and measurement instruments that is independent of the high-bandwidth communication link and has a second latency that is less than the first latency for communication with the second test and measurement instrument; and communicating, over the selected high-bandwidth communication link or low-latency communication link, with the second test and measurement instrument.

16. The method of claim 15, wherein the type of communication is one of a transfer of test data between the first test and measurement instrument and the second test and measurement instrument and a control command to be communicated between first test and measurement instrument and the second test and measurement instrument.

17. The method of claim 16, wherein selecting further comprises:

selecting the high-bandwidth communication link when the type of communication is the transfer of test data between the first test and measurement instrument and the second test and measurement instrument; and selecting the low-latency communication link when the type of communication is a control command to be communicated between the first test and measurement instrument and the second test and measurement instrument.

18. A test and measurement system, comprising:

a first test and measurement instrument;

a plurality of additional test and measurement instruments; and a dual-band communication link coupled between the first test and measurement instrument and the plurality of additional test and measurement instruments, the dual-band communication link configured to provide a high-bandwidth communication link having a first latency to transfer test data between the first test and measurement instrument and each of the plurality of additional test and measurement instruments, and the dual-band communication link further configured to provide a low-latency communication link that is independent of the high-bandwidth communication link, the low-latency communication link having a second latency that is less than the first latency to communicate control commands between the first test and measurement instrument and each of the plurality of additional test and measurement instruments.

19. The test and measurement system of claim 18, where each of the high-bandwidth communication link and the low-latency communication link comprises an intermediary switch coupled between the first test and measurement instrument and each of the plurality of additional test and measurement instruments.

20. The test and measurement system of claim 18, wherein the first test and measurement instrument and each of the plurality of additional test and measurement instruments is an oscilloscope.

* * * * *